(12) United States Patent
Bergqvist et al.

(10) Patent No.: US 9,749,850 B2
(45) Date of Patent: Aug. 29, 2017

(54) SYSTEM AND METHOD OPERABLE TO ENABLE SHORTEST CONNECTION ROUTE

(75) Inventors: Per Bergqvist, Luxembourg (LU); Stefam Willehadson, Uppsala (SE)

(73) Assignee: Synapse International S.A., Mamer (LU)

( * ) Notice: Subject to any disclaimer, the term of this patent is extended or adjusted under 35 U.S.C. 154(b) by 439 days.

(21) Appl. No.: 13/256,660

(22) PCT Filed: Mar. 25, 2010

(86) PCT No.: PCT/SE2010/050328
§ 371 (c)(1),
(2), (4) Date: Sep. 29, 2011

(87) PCT Pub. No.: WO2010/114463
PCT Pub. Date: Oct. 7, 2010

(65) Prior Publication Data
US 2012/0014283 A1    Jan. 19, 2012

(30) Foreign Application Priority Data

Apr. 1, 2009  (SE) ...................................... 0950212

(51) Int. Cl.
*H04W 8/26*  (2009.01)
*H04W 36/06*  (2009.01)
(Continued)

(52) U.S. Cl.
CPC .............. *H04W 8/26* (2013.01); *H04W 36/06* (2013.01); *H04W 80/04* (2013.01); *H04W 88/16* (2013.01)

(58) Field of Classification Search
CPC .................................................. H04W 36/06
(Continued)

(56) References Cited

U.S. PATENT DOCUMENTS 7,149,229 B1 * 12/2006 Leung ........................... 370/466
7,272,392 B2 *  9/2007 Boda ........................... 455/432.1
(Continued)

FOREIGN PATENT DOCUMENTS

CA    2681039 A1    9/2008
WO    01/76188     10/2001
(Continued)

OTHER PUBLICATIONS

International Search Report issued on Jul. 26, 2010 in International Application No. PCT/SE2010/050328 filed Mar. 25, 2010.
(Continued)

*Primary Examiner* — Mohammad Anwar
*Assistant Examiner* — Angel Brockman
(74) *Attorney, Agent, or Firm* — Drinker Biddle & Reath LLP

(57) ABSTRACT

The present invention relates to a system operable to enable shortest connection roué for a mobile means of a subscriber, when the mobile means has roamed between a home network comprised in the system, and a foreign network comprised in the system. When the mobile means requests connection to Internet, a serving means comprised in the foreign network is operable to communicate with, and to receive information regarding the connection route from, a Home Location Register comprised in the home network. The serving means is operable to route a packet to a gateway means comprised in the foreign network. The gateway means is in turn operable to allocate an IP address for the mobile means and to function as an access point to Internet.

12 Claims, 2 Drawing Sheets

(51) Int. Cl.
*H04W 80/04* (2009.01)
*H04W 88/16* (2009.01)

(58) Field of Classification Search
USPC .......................................... 370/253, 328, 252
See application file for complete search history.

(56) References Cited

U.S. PATENT DOCUMENTS

| | | | | |
|---|---|---|---|---|
| 7,958,238 | B1* | 6/2011 | Batz et al. ..................... | 709/225 |
| 7,974,627 | B2* | 7/2011 | Mia et al. ...................... | 455/440 |
| 8,150,397 | B2* | 4/2012 | Khetawat et al. ............. | 455/436 |
| 8,442,485 | B2 | 5/2013 | Chowdhury et al. | |
| 8,898,293 | B2* | 11/2014 | Raleigh et al. ............... | 709/224 |
| 2002/0085517 | A1* | 7/2002 | Lee et al. ...................... | 370/331 |
| 2004/0017905 | A1* | 1/2004 | Warrier et al. .......... | 379/114.15 |
| 2004/0228347 | A1 | 11/2004 | Hurtta et al. | |
| 2005/0282559 | A1* | 12/2005 | Erskine et al. ............. | 455/456.4 |
| 2006/0104284 | A1* | 5/2006 | Chen .......................... | 370/395.3 |
| 2006/0274672 | A1 | 12/2006 | Venkitaraman et al. | |
| 2006/0291422 | A1 | 12/2006 | Rochford | |
| 2007/0291705 | A1 | 12/2007 | Iyer et al. | |
| 2011/0122815 | A1* | 5/2011 | Velev et al. .................. | 370/328 |
| 2012/0008564 | A1* | 1/2012 | Bergqvist et al. ............. | 370/328 |
| 2012/0014283 | A1 | 1/2012 | Bergqvist et al. | |

FOREIGN PATENT DOCUMENTS

| | | |
|---|---|---|
| WO | 03/015353 | 2/2003 |
| WO | 03/058996 | 7/2003 |
| WO | 2007/104324 | 9/2007 |
| WO | 2008/003337 | 1/2008 |

OTHER PUBLICATIONS

L. Morand et al., "Global mobility approach with Mobile IP in "ALL IP" networks," IEEE, 2002.

Notice of Allowance mailed Jun. 18, 2014 in related U.S. Appl. No. 13/256,334.

Supplementary European Search Report dated Mar. 24, 2015 issued in related European Application No. EP 10 75 9118 (4 pages).

"3rd Generation Partnership Project; Technical Specification Group Services and System Aspects; General Packet Radio Service (GPRS); Service description; Stage 2 (Release 8)", 3 GPP Standard; 3GPP TS 23.060, 3rd Generation Partnership Project (3GPP), Mobile Competence Centre; 650 Route des Lucioles—F-06921 Sophia Antipolis, Valbonne—France, No. V8.4.0, Mar. 16, 2009, pp. 1-276, XP050362324.

"3rd Generation Partnership Project; Technical Specification Group Services and System Aspects; Telecommunication management; Charging management; Charging architecture and principles (Release 7)", 3 GPP Standard; 3GPP TS 32.240, 3rd Generation Partnership Project (3GPP), Mobile Competence Centre; 650 Route des Lucioles—F-06921 Sophia Antipolis, Valbonne—France, No. V7.2.0, Mar. 26, 2007, pp. 1-40, XP050374396.

"3rd Generation Partnership Project; Technical Specification Group Service and System Aspects; Telecommunication management; Charging management; Charging Data Record (CDR) file format and transfer (Release 7)", 3GPP Standard; 3 GPP TS 32.297, 3rd Generation Partnership Project (#GPP), Mobile Competence Centre; 650 Route des Lucioles; F-06921 Sophia Antipolis, Vaibonne—France. No. V7.1.0 Mar. 27, 2008, pp. 1-24, XP050374611.

\* cited by examiner

SYSTEM AND METHOD OPERABLE TO ENABLE SHORTEST CONNECTION ROUTE

CROSS REFERENCE TO RELATED APPLICATIONS

This application is a §371 National Stage Application of PCT International Application No. PCT/SE2010/050328, filed Mar. 25, 2010, and claims priority under 35 U.S.C. §119 and/or §365 to Swedish Application No. 0950212-1 filed Apr. 1, 2009.

FIELD OF THE INVENTION

The present invention relates in a first aspect to a system operable to enable shortest connection route for a mobile means of a subscriber.

According to a second aspect the present invention relates to a method for enabling shortest connection route for a mobile means of a subscriber.

According to a third aspect the present invention relates to at least one computer program product for enabling shortest connection route for a mobile means of a subscriber.

BACKGROUND OF THE INVENTION

The patent document US 2006/0291422 A1 relates to mobility management in a communication system of at least two communication networks. A mobile node is associated with one of the at least two communication networks as a home network and is allocated a global home address, a certificate and a corresponding private key by a home agent of the home network. When roaming in a communication network other than the home network, the mobile node requests a binding operation of a current routing address in the other communication network and the global home address at the home agent of the home network, comprising, at the home agent, the use of the correct allocated global home address by the mobile node by means of a digital signature and the certificate allocated to the mobile node.

The patent document WO 01/76188 A2 relates to a method of allocating a network address for an application to use during a session between a first node in a domain and a mobile node in a visited domain. The method comprises the steps of allocating a care of address with a global home agent associated with the mobile node; the global home agent informing the first node of the allocated care of address; and the first node informing the application of the care of address.

The patent document US 2007/0291705 A1 relates to techniques for proving location/presence-based information using mobile IP. A mobile node is associated with a home agent in a home network different from the access network. The location/presence-based information is determined at the point of attachment and is added to a registration request at the layer 3 protocol layer. The registration request is then sent from the point of attachment to the home agent. When the registration request is received at the home agent, the home agent parses the registration request to determine the location/presence-based information from the request. The home agent then performs a location/presence service using the location/presence information.

The patent document US 2006/0274672 A1 relates to a system and method that reduces unnecessary data traffic over the access links to a mobile router or to other network components. Packets that are to be sent unnecessarily to the mobile router are intercepted before they can be sent to a router or other network device. Consequently, system resources are not used for the unnecessary data transmissions and the efficiency of the network is substantially enhanced.

The document "Global mobility approach with Mobile IP in "All IP" networks"; L. Morand; S. Tessier; IEEE, relates to how the EUROSCOM project P1013FIT-MIP evaluates the use of Mobile IP in an IP core network, acting as a mobility management protocol federating heterogeneous access network technologies such as PSTN, Wlan or GPRS. The aim is to provide a wide IP environment with an always-on access to IP applications, Mobile IP functionalities enabling seamless mobility through the various networks.

In the world today it is quite common that people travel to other countries as tourists or for business reasons bringing with them their computers that are connected to the Internet using the cellular networks. The connection is routed via the guest operators network to the home operators network via a gateway and then to the Internet via the home operators access point. This routing is not optimal in the sense of network usage, e. g. a lot of bandwidth between the operators are used for no particular reason.

The above mentioned solutions suffer from a lot of disadvantages. Current Internet routings when roaming into a guest operators network are non-optimal leading to, among other things, higher costs for the operator as well as the subscriber as well as slower Internet connections. Very often the cost plan for a particular subscriber is a non flat rate or a virtual flat rate leading to the situation that the home operator wants to keep track of the amount of transferred data. This leads to the current situation that the operator wants, and also needs, to do the actual Internet access for the subscriber using the operators own Internet access point. Consequently, the usage of the operators' network is non-optimal giving rise to cost and network problems.

SUMMARY OF THE INVENTION

The above mentioned problems are solved with a system operable to enable shortest connection route for a mobile means of a subscriber according to Claim 1, when the mobile means has roamed between a home network comprised in the system, and a foreign network comprised in the system. When the mobile means requests connection to Internet, a serving means comprised in the foreign network is operable to communicate with, and to receive information regarding the connection route from, a Home Location Register comprised in the home network. The serving means is operable to route a packet to a gateway means comprised in the foreign network, wherein the gateway means is operable to allocate an IP address for the mobile means and to function as an access point to Internet.

A main advantage with this solution is that it is possible for the operators to optimize the network usage regarding subscribers that are accessing the Internet.

A further advantage in this context is achieved if the gateway means also is operable to count every byte transferred to/from the mobile means, and to communicate the count of bytes to the home network.

Furthermore, it is an advantage in this context if the serving means is operable to receive information regarding the connection route in the form of appointing of access point for General Packet Radio Services (GPRS).

According to another embodiment it is an advantage if the serving means is operable to receive information regarding the connection route in the form of an attribute describing the roaming agreement.

A further advantage in this context is achieved if the gateway means is operable to communicate the count of bytes to the home network upon request. Hereby, the communication can be performed at will.

According to another embodiment it is an advantage if the gateway means is operable to communicate the count of bytes to the home network at the end of a session. In this way it is secured that the communication is performed regularly.

Furthermore, it is an advantage in this context if the serving means is in the form of a Serving GPRS Support Node.

A further advantage in this context is achieved if the gateway means is in the form of a Gateway GPRS Support Node.

Furthermore, it is an advantage in this context if the mobile means is in the form of a mobile telephone, a personal digital assistant (PDA), or a mobile computer.

The above mentioned problems are also solved with a method for enabling shortest connection route according to Claim 10, when the mobile means has roamed between a home network and a foreign network. The method is performed with the aid of a system comprising the home network and the foreign network. The method comprises the steps:

with the aid of the mobile means, to request connection to Internet;

with the aid of a serving means comprised in the foreign network, to communicate with, and to receive information regarding the connection route from, a Home Location Register comprised in the home network;

with the aid of the serving means, to route a packet to a gateway means comprised in the foreign network; and with the aid of the gateway means, to allocate an IP address for the mobile means, and to function as an access point to Internet.

A main advantage with this solution is that it is possible for the operators to optimize the network usage regarding subscribers that are accessing the Internet.

A further advantage in this context is achieved if the method also comprises the steps:

with the aid of the gateway means, to count every byte transferred to/from the mobile means; and to communicate the count of bytes to the home network.

Furthermore, it is an advantage in this context if the step of receiving information regarding the connection route is performed by receiving an appointing of access point for General Packet Radio Services (GPRS).

According to another embodiment it is an advantage if the step of receiving information regarding the connection route is performed by receiving an attribute describing the roaming agreement.

A further advantage in this context is achieved if the step to communicate the count of bytes to the home network is performed upon request. Hereby, the communication can be performed at will.

According to another embodiment it is an advantage if the step to communicate the count of bytes to the home network is performed at the end of a session. In this way it is secured that the communication is performed regularly.

The above mentioned problems are also solved with at least one computer program product according to Claim 16. The at least one computer program product is/are directly loadable into the internal memory of at least one digital computer, and comprises software code portions for performing the steps of the method according to the present invention when the at least one product is/are run on the at least one computer.

A main advantage with this solution is that it is possible for the operators to optimize the network usage regarding subscribers that are accessing the Internet.

It will be noted that the term "comprises/comprising" as used in this description is intended to denote the presence of a given characteristic, step or component, without excluding the presence of one or more other characteristic, features, integers, steps, components or groups thereof.

Embodiments of the invention will now be described with a reference to the accompanying drawings, in which:

DETAILED DESCRIPTION OF THE PREFERRED EMBODIMENTS

Figure 1:
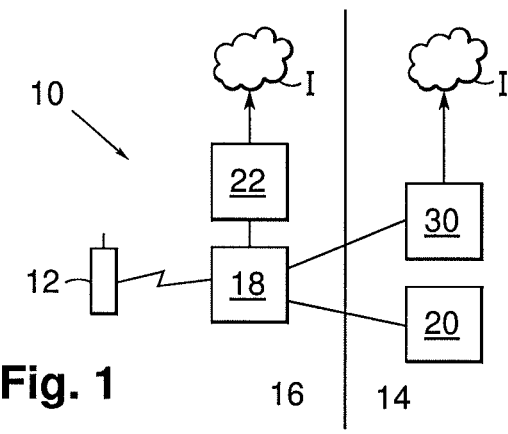
FIG. 1 is a block diagram of a system operable to enable shortest connection route for a mobile means of a subscriber according to the present invention.

In FIG. 1 there is disclosed a block diagram of a system 10 operable to enable shortest connection route for a mobile means 12 of a subscriber according to the present invention. The system 10 is operable to enable shortest connection route for the mobile means 12 of a subscriber, when the mobile means 12 has roamed between a home network 14 comprised in the system 10, and a foreign network 16 comprised in the system 10. The home network 14 and the foreign network 16 are only disclosed schematically in FIG. 1, by having a dividing line in FIG. 1 between the home network 14 and the foreign network 16. As is apparent in FIG. 1, the foreign network 16 also comprises a serving means 18, which is operable to communicate with, and to receive information regarding the connection route from, a Home Location Register 20 comprised in the home network 14. In the foreign network 16 the serving means 18 is connected to a gateway means 22. Furthermore, the serving means 18 is also connected to the Home Location Register 20 and a gateway means 30, both comprised in the home network 14. The serving means 18 is also operable to route a packet to the gateway means 22, and the gateway means 22 is operable to allocate an IP address for the mobile means 12 and to function as an access point to Internet I. As is apparent in FIG. 1, Internet I are schematically disclosed in form of two "clouds" I, one "cloud" each in the home network 14 and in the foreign network 16, because it is possible to access Internet both via the home network 14 and the foreign network 16.

According to a preferred embodiment, the gateway means 22 is also operable to count every byte transferred to/from the mobile means 12, and to communicate the count of bytes to the home network 14.

Furthermore, according to another embodiment, the serving means 18 is operable to receive information regarding the connection route in the form of appointing of access point for General Packet Radio Services (GPRS).

According to yet another embodiment, the serving means 18 is operable to receive information regarding the connection route in the form of an attribute describing the roaming agreement.

The gateway means 22 is, according to one alternative, operable to communicate the count of bytes to the home network 14 upon request.

The gateway means 22 is, according to another alternative, operable to communicate the count of bytes to the home network 14 at the end of a session.

This makes it possible for the home operator to be able to charge the subscriber correctly. This is extremely important when the cost plan for the subscriber is a non flat rate.

According to a preferred embodiment, the serving means 18 is in the form of a Serving GPRS Support Node (SGSN).

According to another embodiment, the gateway means 22, and possibly the gateway means 30, each is in the form of a Gateway GPRS Support Node (GGSN).

According to yet another embodiment, the mobile means 12 is in the form of a mobile telephone, a personal digital assistant (PDA), or a mobile computer.

Figure 2:
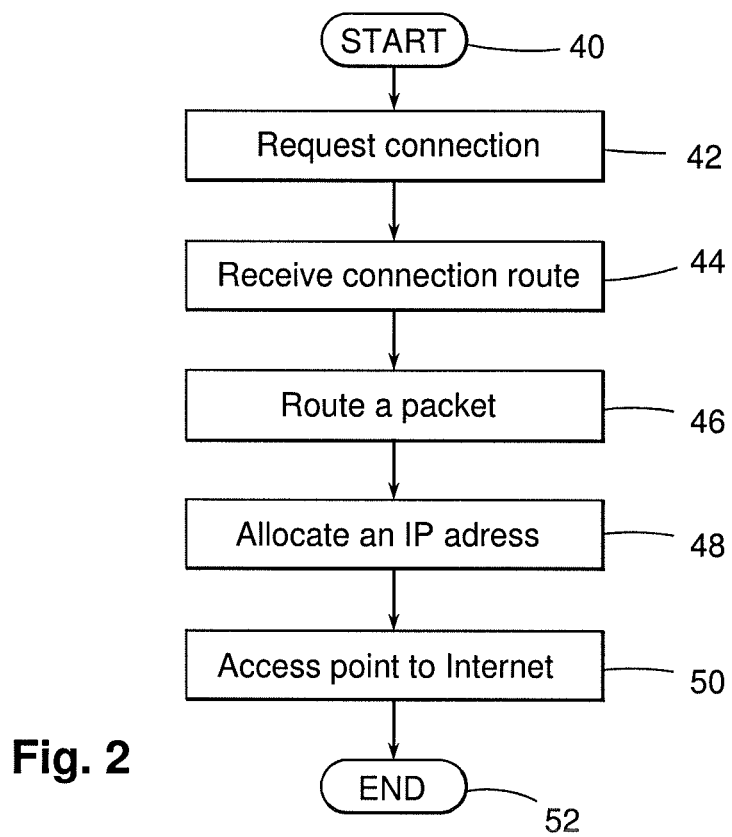
FIG. 2 is a flow chart of a method for enabling shortest connection route for a mobile means of a subscriber according to the present invention.

In FIG. 2 there is disclosed a flow chart of a method for enabling shortest connection route for a mobile means 12 (see FIG. 1) of a subscriber according to the present invention. The method is performed with the aid of a system 10 (see FIG. 1), when the mobile means 12 has roamed between a home network 14 comprised in the system 10, and a foreign network 16 comprised in the system 10. The method begins at block 40. Thereafter, the method continues, at block 42, with the step: to request connection to Internet with the aid of the mobile means 12. The method continues, at block 44, with the step: with the aid of a serving means 18 comprised in the foreign network 16, to communicate with, and to receive information regarding the connection route from, a Home Location Register 20 comprised in the home network 14. Thereafter, the method continues, at block 46, with the step: to route a packet to a gateway means 22 comprised in the foreign network 16 with the aid of the serving means 18. The method continues, at block 48, with the step: to allocate an IP address for the mobile means 12 with the aid of the gateway means 22. Thereafter, the method continues, at block 50, with the step: the gateway means 22 functions as an access point to Internet. The method is completed at block 52.

According to a preferred embodiment, the method also comprises the steps: to count every byte transferred to/from the mobile means 12 with the aid of the gateway means 22; and to communicate the count of bytes to the home network 14.

Furthermore, according to another embodiment, the step of receiving information regarding the connection route is performed by receiving an appointing of access point for General Packet Radio Services (GPRS).

As an alternative, the step of receiving information regarding the connection route is performed by receiving an attribute describing the roaming agreement.

According to a preferred embodiment, the step to communicate the count of bytes to the home network 14 is performed upon request.

According to another embodiment, the step to communicate the count of bytes to the home network 14 is performed at the end of a session.

Figure 3:
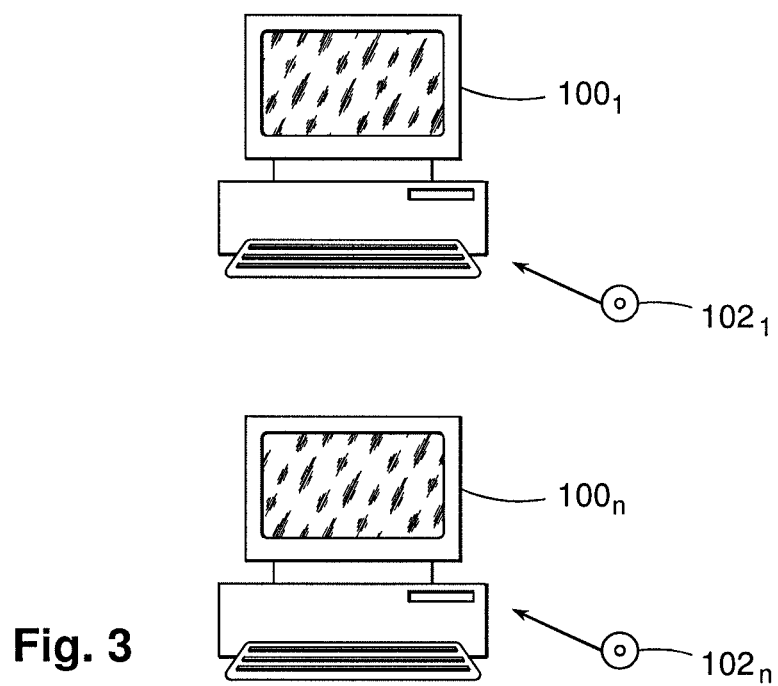
FIG. 3 schematically shows a number of computer program products according to the present invention.

In FIG. 3, some computer program products $102_1, \ldots, 102_n$ according to the present invention are schematically shown. In FIG. 3, n different digital computers $100_1, \ldots, 100_n$ are shown, wherein n is an integer. In FIG. 3, n different computer program products $102_1, \ldots, 102_n$ are shown, here shown in the form of CD discs. The different computer program products $102_1, \ldots, 102_n$ are directly loadable into the internal memory of the n different computers $100_1, \ldots, 100_n$. Each computer program product $102_1, \ldots, 102_n$ comprises software code portions for performing all the steps according to FIG. 2, when the product/products $102_1, \ldots, 102_n$ is/are run on the computers $100_1, \ldots, 100_n$. The computer program products $102_1, \ldots, 102_n$ may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following Claims.

The invention claimed is:

1. A system operable to enable shortest connection route for a mobile device of a subscriber, the system comprising:
    a home network of the mobile device having a Home Location Register and a first gateway; and
    a foreign network having a serving device and a second gateway, the serving device connected to the Home Location Register and the first gateway of the home network, and connected to the second gateway of the foreign network,
    wherein when said mobile device has roamed between the home network and the foreign network and when said mobile device requests connection to the Internet via the foreign network, the serving device of the foreign network is operable to communicate directly with, and to receive information regarding the connection route from, the Home Location Register of the home network without accessing a serving device of the home network,
    wherein said serving device of the foreign network is operable to route a packet to the second gateway,
    wherein said second gateway of the foreign network is operable to allocate an IP address for said mobile device and to function as an access point to the Internet from its position within the foreign network,
    wherein said second gateway of the foreign network is operable to count every byte transferred to and from said mobile device while said mobile device is connected to the Internet via the foreign network, and to communicate said count of bytes to said home network upon request or at the end of a session.

2. The system according to claim 1, wherein said serving device is operable to receive information regarding the connection route in the form of appointing of access point for General Packet Radio Services (GPRS).

3. The system according to claim 1, wherein said serving device is operable to receive information regarding the connection route in the form of an attribute describing the roaming agreement.

4. The system according to claim 1, wherein said serving device is in the form of a Serving GPRS Support Node.

5. The system according to claim 1, wherein said second gateway is in the form of a Gateway GPRS Support Node.

6. The system according to claim 1, wherein said mobile device is at least one of a mobile telephone, a personal digital assistant (PDA), and a mobile computer.

7. The system according to claim 1, wherein the serving device of the foreign network is operable to communicate with the Home Location Register of the home network without accessing the first gateway of the home network.

8. A method for enabling shortest connection route by a system for a mobile device of a subscriber, the system including a home network of the mobile device having a Home Location Register and a first gateway, and a foreign network having a serving device and a second gateway, the serving device connected to the Home Location Register and the first gateway of the home network, and connected to the second gateway of the foreign network, when said mobile device has roamed between the home network and the foreign network, the method comprises the steps of:

requesting connection to the Internet by said mobile device via the foreign network;

communicating directly with and receiving information regarding the connection route from the Home Location Register of the home network by the serving device without accessing a serving device of the home network;

routing a packet to the second gateway with the serving device of the foreign network;

allocating an IP address for said mobile device and functioning as an access point to the Internet by the second gateway from its position within the foreign network;

counting every byte transferred to and from said mobile device while said mobile device is connected to the Internet via the foreign network using said second gateway of the foreign network; and communicating said count of bytes from the second gateway to said home network upon request or at the end of a session.

9. The method according to claim 8, wherein said step of receiving information regarding the connection route includes receiving an appointing of access point for General Packet Radio Services (GPRS).

10. The method according to claim 8, wherein said step of receiving information regarding the connection route is performed by receiving an attribute describing the roaming agreement.

11. A non-transitory computer readable medium having computer instructions recorded thereon, the computer instruction loadable into the internal memory of at least one digital computer, the computer instructions comprising software code that is configured to perform the steps of the method according to claim 10 when executed by said at least one computer.

12. The method according to claim 8, wherein in the step of communicating with and receiving information, the serving device of the foreign network is operable to communicate with the Home Location Register of the home network without accessing the first gateway of the home network.

* * * * *

UNITED STATES PATENT AND TRADEMARK OFFICE
CERTIFICATE OF CORRECTION

PATENT NO. : 9,749,850 B2
APPLICATION NO. : 13/256660
DATED : August 29, 2017
INVENTOR(S) : Per Bergqvist et al.

It is certified that error appears in the above-identified patent and that said Letters Patent is hereby corrected as shown below:

On the Title Page

In item (75) "Inventors" change "Stefam Willehadson" to --Stefan Willehadson--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*